United States Patent
Lind et al.

(10) Patent No.: US 8,999,216 B2
(45) Date of Patent: Apr. 7, 2015

(54) METHOD OF MANUFACTURING AN ARTICLE BY MOLDING

(71) Applicants: Soeren Oemann Lind, Næstved (DK); Finn Daugaard Madsen, Billund (DK); Jason Stege, Brande (DK)

(72) Inventors: Soeren Oemann Lind, Næstved (DK); Finn Daugaard Madsen, Billund (DK); Jason Stege, Brande (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/792,360

(22) Filed: Mar. 11, 2013

(65) Prior Publication Data

US 2013/0241117 A1  Sep. 19, 2013

(30) Foreign Application Priority Data

Mar. 14, 2012  (EP) .................................... 12159420

(51) Int. Cl.
| | |
|---|---|
| B29C 70/30 | (2006.01) |
| B29D 99/00 | (2010.01) |
| B29C 70/44 | (2006.01) |
| B29C 70/48 | (2006.01) |
| B29L 31/08 | (2006.01) |

(52) U.S. Cl.
CPC .......... B29D 99/0025 (2013.01); B29C 70/443 (2013.01); B29C 70/48 (2013.01); B29L 2031/085 (2013.01)

(58) Field of Classification Search
USPC ................................................ 264/316, 258
See application file for complete search history.

(56) References Cited

U.S. PATENT DOCUMENTS

| | | | | | |
|---|---|---|---|---|---|
| 2,613,397 | A | * | 10/1952 | Borkland | 264/316 |
| 2,613,398 | A | * | 10/1952 | Croweil | 264/517 |
| 3,568,254 | A | * | 3/1971 | Stolki | 425/388 |
| 4,132,755 | A | * | 1/1979 | Johnson | 264/553 |
| 4,548,859 | A | | 10/1985 | Kline | |
| 4,808,362 | A | * | 2/1989 | Freeman | 264/257 |
| 4,946,640 | A | * | 8/1990 | Nathoo | 264/316 |
| 5,013,514 | A | * | 5/1991 | Azzani et al. | 264/512 |
| 5,108,532 | A | * | 4/1992 | Thein et al. | 156/285 |
| 5,203,940 | A | * | 4/1993 | Krone | 156/196 |
| 5,374,388 | A | * | 12/1994 | Frailey | 264/510 |
| 5,464,337 | A | * | 11/1995 | Bernardon et al. | 425/112 |
| 5,578,158 | A | * | 11/1996 | Gutowski et al. | 156/285 |
| 7,048,985 | B2 | * | 5/2006 | Mack et al. | 428/111 |
| 2004/0145095 | A1 | * | 7/2004 | McCollum et al. | 264/544 |
| 2008/0304971 | A1 | * | 12/2008 | Liebmann | 416/20 R |

FOREIGN PATENT DOCUMENTS

| | | |
|---|---|---|
| EP | 1310351 B1 | 4/2006 |
| FR | 2597395 A1 | 10/1987 |
| WO | WO 2006058540 A1 | 6/2006 |
| WO | WO 2006058541 A1 | 6/2006 |
| WO | WO 2007038930 A1 | 4/2007 |

* cited by examiner

*Primary Examiner* — Matthew Daniels

(57) ABSTRACT

A method of manufacturing a component by molding is provided. A mold has a mold surface representing a negative image of the component. The mold has openings in the mold surface. Flow channels extending from the openings in the mold surface and are connectable to a suction device. Further, the mold has a periphery delimiting the mold surface. A bag is fixed to the periphery of the mold. The bag is inflated to a pressure level above ambient pressure. The pressure is released from the bag while sucking the bag to the mold surface using the suction device. Fabrics are layered onto the bag while the bag is kept sucked to the mold surface. Resin is introduced into the fabrics and then the resin is cured.

7 Claims, 3 Drawing Sheets

METHOD OF MANUFACTURING AN ARTICLE BY MOLDING

CROSS REFERENCE TO RELATED APPLICATIONS

This application claims priority of European Patent Application No. 12159420.4 EP filed Mar. 14, 2012. All of the applications are incorporated by reference herein in their entirety.

FIELD OF INVENTION

A method of manufacturing a component by molding is provided. More specifically, a method of manufacturing a wind turbine rotor blade by molding is provided.

BACKGROUND OF INVENTION

Large molded articles, like for example wind turbine rotor blades, are typically manufactured by resin transfer molding (RTM) and, in particular, by vacuum assisted resin transfer molding (VARTM). In such methods, fiber material is laid in a mold cavity and then a resin is injected into the fiber material. In case of vacuum assisted resin transfer molding, a vacuum is applied to the mold cavity in order to assist the injection of resin into the fiber material. To allow for removing the finished article from the mold, a release agent is provided between the surface of the mold cavity and the fiber material. Examples of resin transfer molding processes are described for example in EP 1 310 351 B1, WO 2006/058540 A1, WO 2006/058541 A1, and WO 2007/038930 A1.

SUMMARY OF INVENTION

It is an objective to provide a method of manufacturing a component by molding. This objective is achieved by a method of manufacturing a component by molding according to the independent claim. The depending claims comprise further embodiments.

The method of manufacturing the component by molding includes several steps. A mold with a mold surface representing a negative image of the component to be manufactured is provided. The mold surface comprises openings and flow channels extending from the openings of the mold surface and being connectable to a suction device. Further, the mold has a periphery delimiting the mold surface. A bag, for example a plastic bag, is attached or fixed to the periphery of the mold. The bag is inflated to a pressure level above ambient pressure, for example 5% to 50% above ambient atmospheric pressure, and in particular between 10% and 20% above ambient atmospheric pressure. The pressure of the plastic bag, which is above ambient pressure, is released from the bag so that the bag is sucked to the mold surface using the suction device. Fabrics, or other materials, for example fiber material, are layered onto the bag while the bag is kept sucked to the mold surface. A resin is introduced into the fabrics, which lay on the bag, and the resin is cured.

Sucking the plastic bag to the mold surface may continue until the resin is cured.

In a specific embodiment, the mold surface represents a negative image of a wind turbine rotor blade.

The described method allows for providing a wrinkle-free air-tight plastic film on the mold surface forming a basis for the layering of fiber material. The plastic material of the plastic bag simplifies releasing the finished component after the molding process without a costly and time-consuming preparation of the mold surface with a release agent. At the same time, the plastic bag forms a replaceable plastic vacuum membrane on the mold surface. Such a membrane allows a high quality surface finish of the molded component. Moreover, when the molded article is finished, the membrane formed by the plastic bag may stay on the mold surface of the component so as to protect the surface during transportation. The plastic bag may then be removed on site after transportation.

In another embodiment, the flow channels are connectable to a pump or blower and a fluid, for example air, is pumped or blown through the flow channels to the openings in the mold surface when the plastic bag is being laid onto the mold surface. The fluid then forms a fluid film between the plastic bag and the mold surface, thus reducing friction and simplifying attaching the plastic bag to the periphery of the mold without wrinkles.

When the mold surface is a concave surface, a plastic bag that is slightly smaller, for example 2% to 10% smaller, in particular 3% to 5% smaller, than the mold surface may be used. Then, at least a part or strip of the plastic bag is heated when the bag is sucked to the mold surface. The heat weakens the plastic in order to allow a final expansion leading to a whole coverage of the mold surface by the plastic bag. For example, hot air may be used for heating the plastic bag.

A suitable material for the use as plastic of the plastic bag is polycarbonate. This material has a melting point that is high enough to withstand the exothermic reaction of the epoxy typically used in resin transfer molding. Yet, the melting point is low enough to allow a final expansion leading to a whole coverage of the mold surface by simply heating the plastic with hot air. Hence, in an embodiment, a polycarbonate bag is used as plastic bag.

DETAILED DESCRIPTION OF INVENTION

The figures show a mold part that is used for forming a wind turbine rotor blade as an example for a component to be manufactured by resin transfer molding. The mold part shown in the figures is the mold part for forming a suction side of the blade. In principle, the blade may be formed by separately forming the shells of the suction side and the pressure side of the blade and then combining both shells to establish the wind turbine rotor blade. On the other hand, it is also possible to form the whole shell in a single molding step if the mold part for forming the pressure side (not shown) and the mold part for forming the suction side are designed such that they may be combined to form a closed molding space and if a mold core is present.

Figure 2:
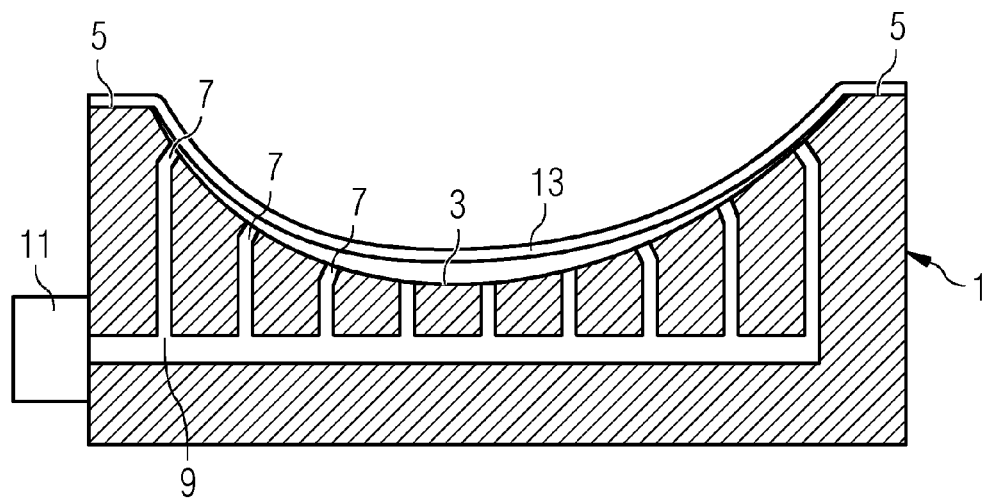
FIG. 2 schematically shows a first step of the method in a sectional view through the mold of FIG. 1.

The mold part 1 (only referred to as mold in the following) shown in the figures comprises a mold surface 3 which is a negative impression of the suction side to be formed (see FIG. 2). Hence, the mold surface has a concave shape. The mold surface 3 is delimited by a periphery 5 which comprises means for fixing a plastic bag 13 thereto. The means may be, for example, an adhesive, clamps, pins, etc. Furthermore, the mold surface comprises a plurality of openings 7 (see FIG. 2) by which a fluid, in particular air, may be sucked from the area above the mold surface or blown into this area. To allow for sucking or blowing, the openings 7 are connectable to a suction device or a blowing device via flow channels 9 which connect the openings 7 to the suction device or blowing device. In the present embodiment, there is a combined suction and blowing device 11, for example a pump or a fan which allows reversing the flow direction. The mold may, for example, be created from aluminum profiles, for example in a milling process.

Figure 1:
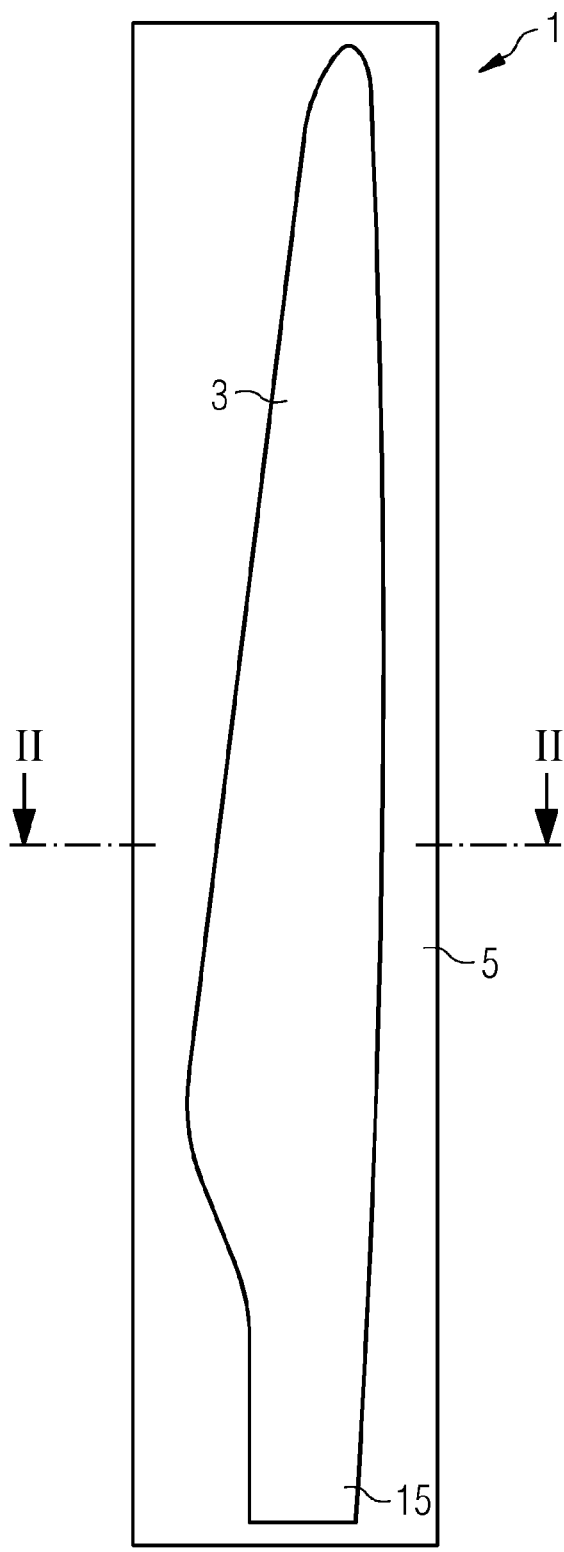
FIG. 1 schematically shows a part of a mold for a wind turbine rotor blade in a top view.

In the following, the method will be described with respect to FIGS. 2 to 5 which schematically show steps of the method in form of sectional views through the mold 1 of FIG. 1.

In a first step of the method, a plastic bag 13 is fixed to the periphery 5 of the mold 1. The dimension of the plastic bag 13 is slightly smaller than the dimension of the mold 1 so that the plastic bag 13 is not contact with the concave mold surface 3, at least in the central part of the mold surface 3. The mold 1 with the plastic bag 13 affixed to the periphery 5 of the mold is shown in FIG. 2.

Putting the plastic bag 13 into the mold 1 may be done for example by unrolling the bag 13 roughly to the correct position and then blowing air out of the openings 7 of the mold surface 3 to reduce friction in the plastic which allows fixing the edges of the plastic bag 13 to the periphery 5 without producing wrinkles in the plastic bag 13.

Figure 3:
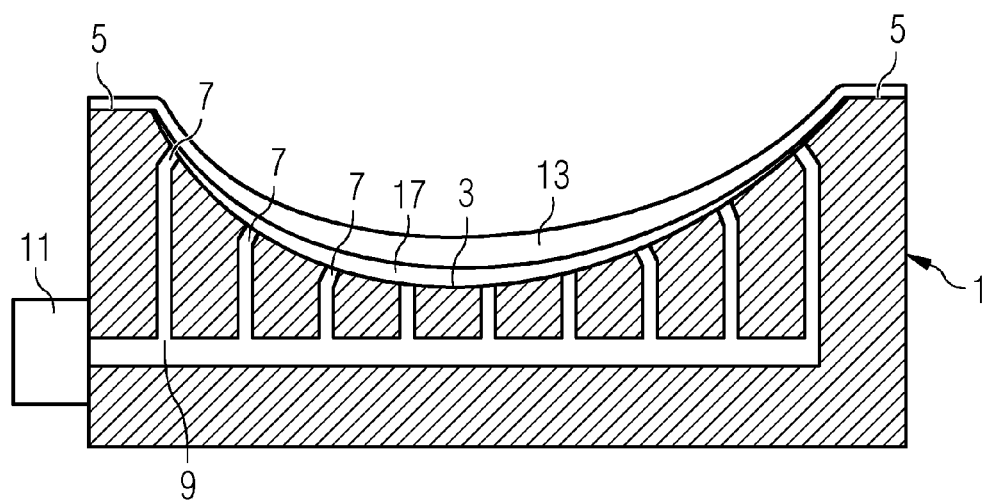
FIG. 3 schematically shows a further step of the method in a sectional view through the mold part of FIG. 1.

Once the edges of the plastic bag 13 are fixed to the periphery 5 of the mold 1, the bag 13 is slightly inflated to remove any uneven tension in the plastic. The inflated bag 13 is shown in FIG. 3.

Once the plastic bag 13 has adapted the correct shape, the pressure that is used for slightly inflating the plastic bag 13 is released and air is slowly sucked out of the space 17 between the plastic 13 and the mold surface 3 by use of the combined suction and blowing device 11. In other words, while the pressure is released vacuum is slowly applied to the space 17 between the bag 13 and the mold surface 3. Thereby, the plastic bag 13 will settle without wrinkles, because the bag 13 is slightly smaller than the convex surface to be covered. The section 15 of the mold surface which defines the root end of the wind turbine rotor blade to be formed (compare FIG. 1) may be slightly extended avoiding sharp angles to allow the plastic bag 13 to adapt the correct shape without wrinkles.

Since the plastic bag 13 is slightly smaller than the surface 3 to be covered, the bag 13 needs to be expanded in order to rest against the mold surface 3. In order to simplify expansion of the bag 13, the plastic bag 13 may be heated, at least in a central strip in order to weaken the plastic thus reducing resistance against expansion of the plastic bag 13. In the present embodiment, the heating is done by a hot air blower 19 that is moved over the plastic bag 13 in the mold 1 and heats at least a central strip of the plastic bag 13. However, other means/devices of heating the plastic bag 13, like infrared lamps, filaments, etc. may be used instead of a hot air blower 19.

Figure 4:
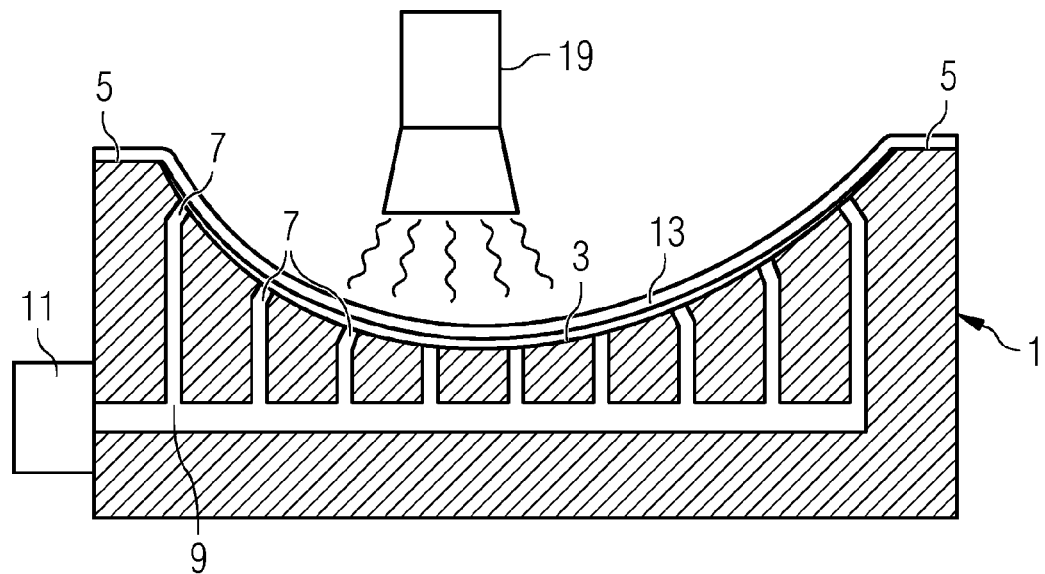
FIG. 4 schematically shows a still further step of the method in a sectional view through the mold part of FIG. 1.

The weakened plastic then allows a final expansion of the plastic bag 13 to bring it to rest against the mold surface 3. The final expansion of the plastic bag 13 by weakening the plastic by the hot air blower 19 is schematically shown in FIG. 4. A suitable plastic material for performing this expansion process is polycarbonate which has the correct temperature resistance for the practical application since the melting point is high enough the withstand the temperatures during the curing of the resin in the molding process, and the melting point of which is yet low enough that it may be weakened for expansion by use of hot air. For the weakened plastic, the suction provided by the combined suction and blowing device 11 is strong enough to suck the plastic against the mold surface 3.

Figure 5:
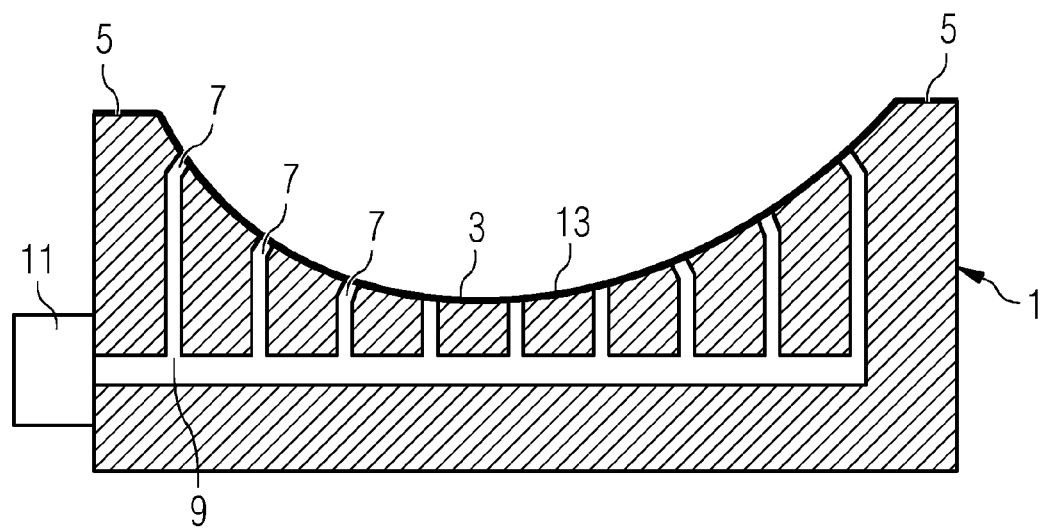
FIG. 5 schematically shows a still further step of the method in a sectional view through the mold part of FIG. 1.

Once the plastic bag 13 rests against the whole mold surface, as shown in FIG. 5, layering of fiber material may begin. After the fiber material has been laid into the mold 1, the mold is closed by a second mold part or an air tight cover like a vacuum bag and resin is introduced into the fiber material. Introducing the resin into the fiber material may be assisted by applying a vacuum to the space accommodating the fiber material.

After the fiber material is impregnated by the liquid resin, heat is applied for curing the resin in order to manufacture the shell of the wind turbine rotor blade. After the curing is complete, the vacuum sucking the plastic bag 13 to the mold surface 3 is released. The plastic bag 13 then allows removing the finished wind turbine rotor blade shell from the mold 1 easily. In addition, removing the shell may be further assisted by blowing air through the openings 7 of the mold surface 3. The plastic bag 13 may be kept at the outside of the wind turbine rotor blade during transportation so as to protect the surface of the rotor blade. The bag 13 would then be removed on the construction site after transportation.

The described method allows a simple and easy removal of the finished wind turbine rotor blade shell from the mold without the use of a release agent. Moreover, using the plastic bag 13 provides a high quality surface finish of the shell since the plastic bag 13 covers the mold surface without wrinkles. Putting the plastic bag 13 onto the mold surface without wrinkles may be achieved by reducing friction by blowing air out of the openings 7 of the mold surface 3. Inflation of the plastic bag 13 then removes unevenly distributed tension in the plastic bag 13. By sucking the plastic bag 13 towards the mold surface 3, while releasing the pressure out of the inflated plastic bag, leaves the bag 13 in tension while it settles towards the mold surface 3 which prevents from a formation of wrinkles in the plastic bag 13. The remaining tension is then removed by the hot air blower 19 or any other suitable heating device to soften the plastic so that the plastic may settle completely to the mold surface 3.

Although the present invention has been described with respect to a specific embodiment in conjunction with the accompanying drawings deviations from this embodiment are possible. For example, while in the present embodiment the heating of the plastic bag is done from the side of the bag which shows away from the mold surface, the heating could as well be done from the mold surface. Moreover, although polycarbonate is mentioned as material of the bag, any other material which is suitable to withstand the temperatures during curing of the resin and which may be sufficiently softened for the final expansion process may be used as material for the plastic bag. Softening does not necessarily need to be performed by heating. It could as well be done by, for example, chemical means. Hence, the present invention shall not be restricted to the exemplary embodiment but shall only be delimited by the appended claims.

We claim:

1. A method of manufacturing a component by molding, comprising:
   providing a mold with a mold surface, wherein the mold represents a negative image of a component to be manufactured, wherein the mold comprises
      openings in the mold surface,
      flow channels extending from the openings and being connectable to a suction device, and
      a periphery delimiting the mold surface;

attaching a bag to the periphery of the mold;
inflating the bag to a pressure level above ambient pressure;
releasing the pressure from the bag while sucking the bag to the mold surface using the suction device;
layering fabrics onto the bag while the bag is kept sucked to the mold surface; and
introducing a resin into the fabrics and curing the resin.

2. The method as claimed in claim 1, wherein the flow channels are connectable to a pump or blower and a fluid is pumped or blown through the flow channels to the openings of the mold surface when the bag is being laid onto the mold surface.

3. The method as claimed in claim 1, wherein the mold surface is a concave surface, wherein the bag is slightly smaller than the mold surface, and wherein at least a strip of the bag is heated when the bag is sucked to the mold surface.

4. The method as claimed in claim 3, wherein hot air is used for heating the bag.

5. The method as claimed in claim 1, wherein the bag is sucked to the mold surface until the resin is cured.

6. The method as claimed in claim 1, wherein the bag comprises polycarbonate.

7. The method as claimed in claim 1, wherein the mold surface represents a negative image of a wind turbine rotor blade.

\* \* \* \* \*